United States Patent [19]
Kraus

[11] Patent Number: 5,433,477
[45] Date of Patent: Jul. 18, 1995

[54] SEAT BELT RELEASE SYSTEM

[76] Inventor: Robert J. Kraus, 155 Minot St., Dorchester, Mass. 02122

[21] Appl. No.: 152,144

[22] Filed: Nov. 16, 1993

[51] Int. Cl.⁶ .............................................. B60R 21/08
[52] U.S. Cl. .................................... 280/749; 280/753
[58] Field of Search ............... 280/802, 804, 808, 749, 280/753; 297/469

[56] References Cited

U.S. PATENT DOCUMENTS

| | | | |
|---|---|---|---|
| 1,186,865 | 6/1916 | Uttz | 280/749 |
| 2,933,343 | 4/1960 | Potts | 280/749 |
| 3,650,542 | 3/1972 | Shimano | 280/749 |
| 3,692,327 | 9/1972 | Barrick, Sr. et al. | 280/749 |
| 5,226,672 | 7/1993 | Husted | 280/749 |

Primary Examiner—Karin L. Tyson
Attorney, Agent, or Firm—John P. Halvonik

[57] ABSTRACT

The invention is a novel seat belt releasing system for vehicles. The system comprises a series of vertically oriented seat belt straps suspended downward from the ceiling of a vehicle in connection with lateral members (such as netting). There are two straps per passenger including the driver. The seat belt releasing system comprises an inertial device which sends an electric signal upon receiving an inertial event. The signal charges a solenoid which releases a pair of sister hooks which in turn allow the main releasing member or coiled spring to be released upon this event thereby pulling on the cables. The cables in connection with the belts pull the belts and netting downward thereby preventing forward movement of the passengers as the netting is secured in front of each passenger. Resilient members are stretched alongside the straps when the seat belts are in the stored, at rest, position, in order to keep the length of the belts minimal.

2 Claims, 6 Drawing Sheets

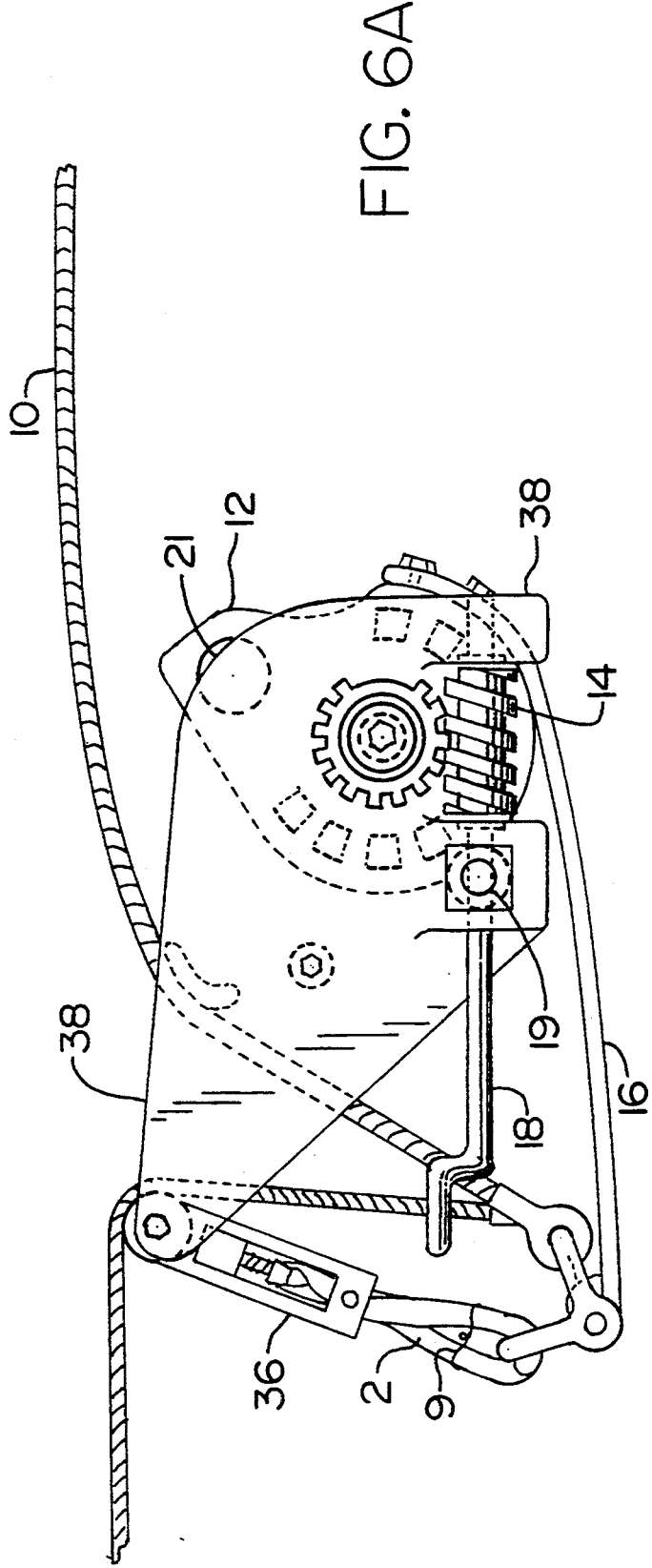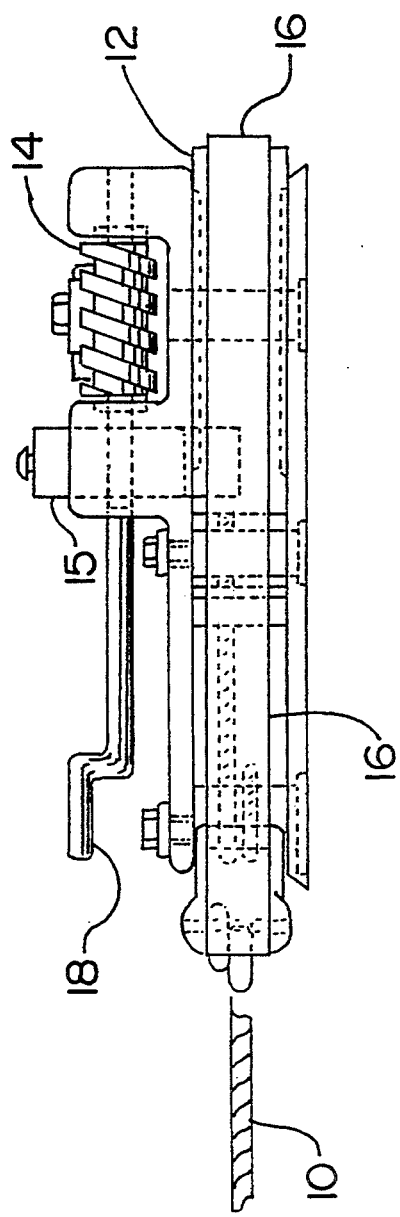

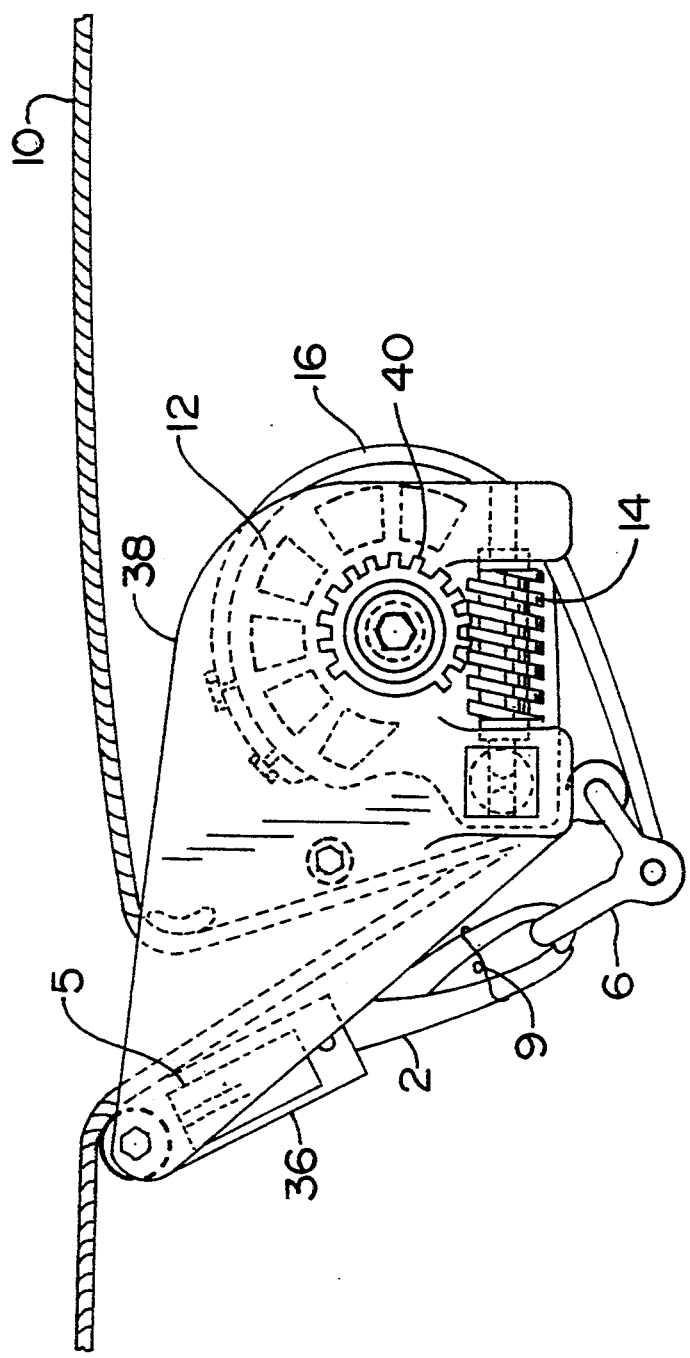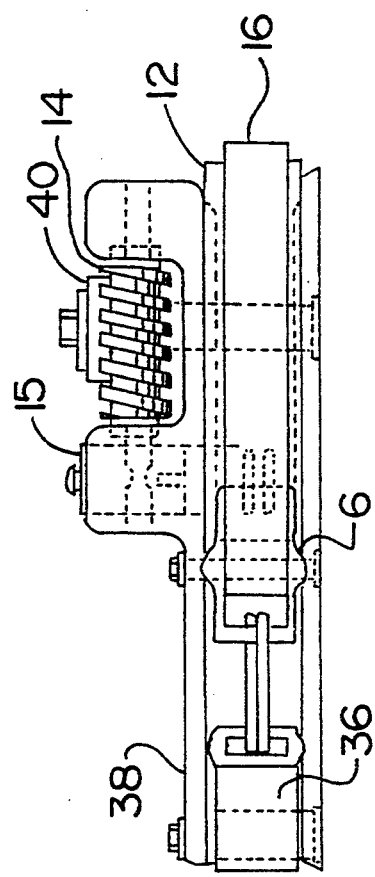

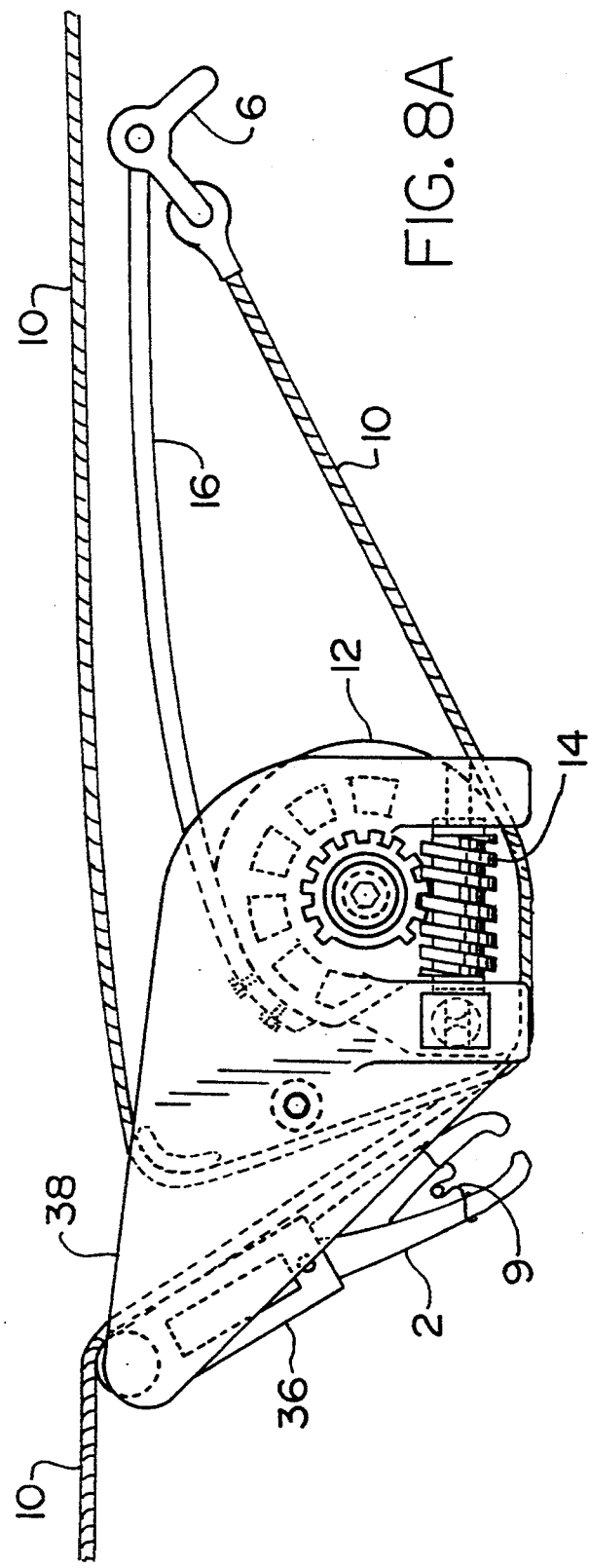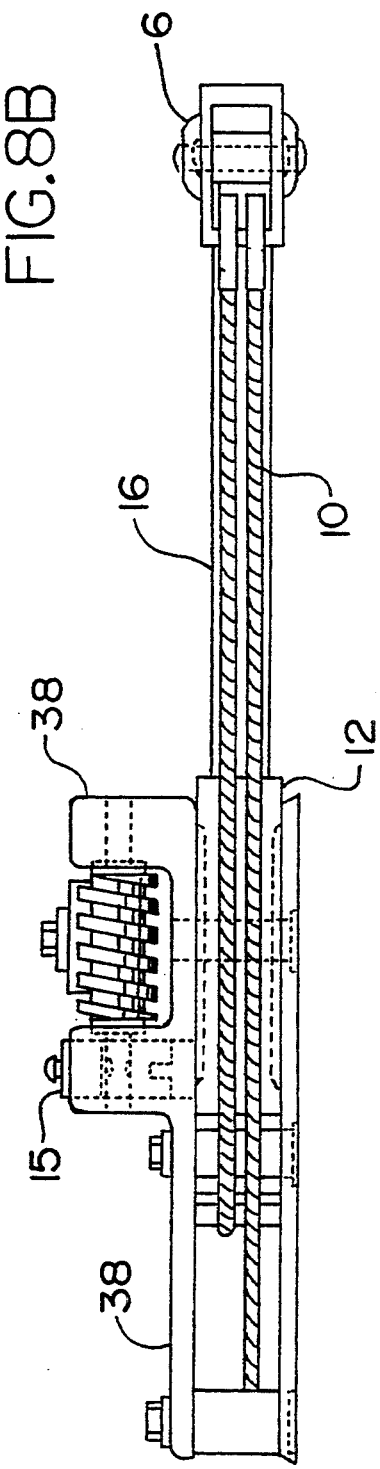

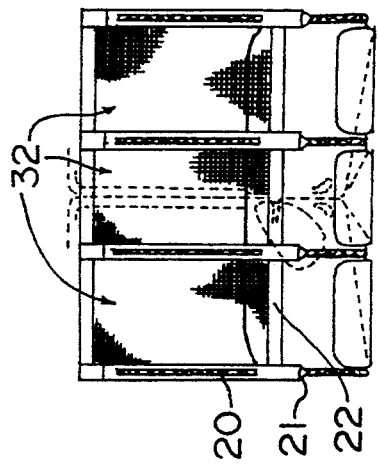
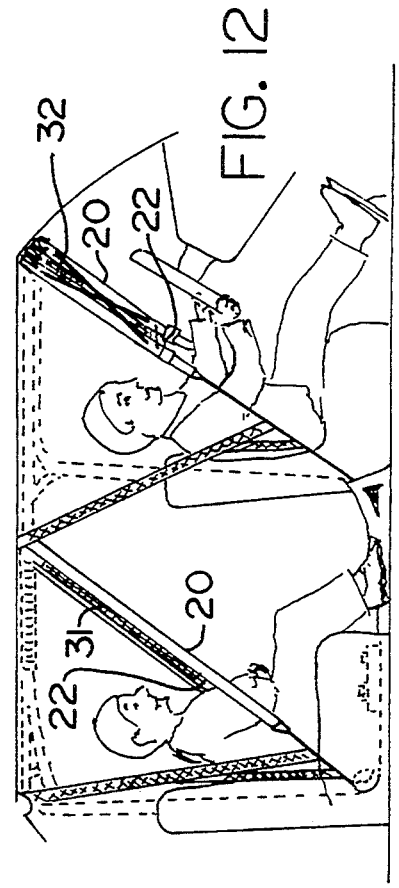
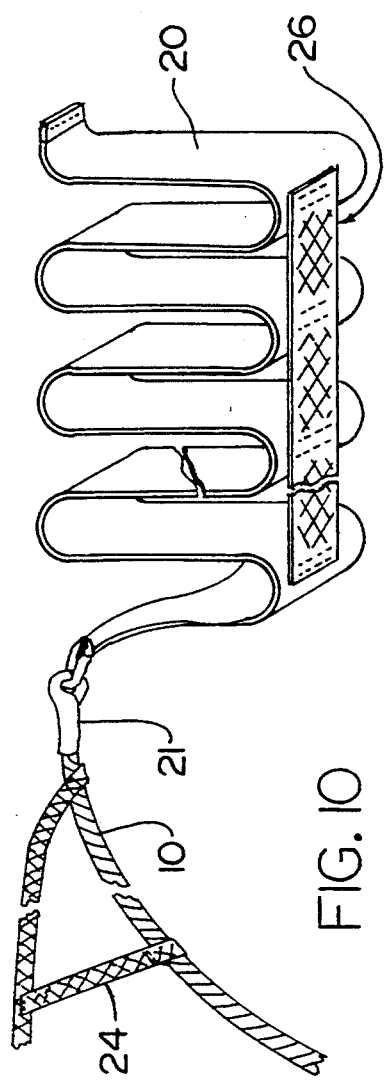
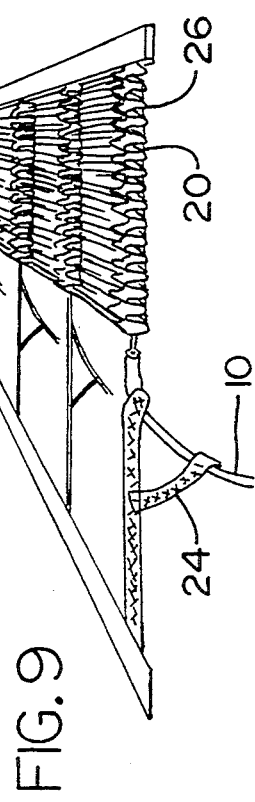

SEAT BELT RELEASE SYSTEM

FIELD AND BACKGROUND OF THE INVENTION

The invention relates to the field of seat belts that are typically used in vehicles and in particular to a novel seat belt releasing system that is activated upon an inertial event and operates to pull seat belts down from a stored position in the ceiling to a position over passengers.

Seat belts are well known in general and find much usefulness in vehicles. One of the drawbacks of most such systems is that they must be worn by the occupants at all times in order to insure that they will operate if they are needed. It is believed that a seat belt system that does not have to be worn but rather, automatically operates any time it is needed would be more effective and not have to rely on humans to place the seat belts on. It is believed that storing the seat belts overhead and then pulling them down in position over the passengers to restrain them would be a most effective solution.

DESCRIPTION OF THE PRIOR ART

Inflatable restraint bags are currently used in vehicles. Such bags have disadvantages in that they can only be used once and then they must be serviced in order to be reset. Bags need to be reinflated, reset, etc. after use. The applicant's system may remain in place indefinitely after release. It does need to be reset, but this may be done manually by the occupants of the car at their convenience and with little effort.

SUMMARY OF THE INVENTION

The invention is a seat belt releasing system for vehicles. Vertically oriented seat belt straps are suspended from the ceiling of the vehicle in the normal, at rest position. Resilient members are stretched alongside the belts to confine the extension of the belts to a minimum. Lateral members, preferably in the form of a netting, are stretched across two seat belts for every passenger. One end of the straps is secured to the ceiling and the other end is connected to wire ropes or other means to a releasing means. The releasing means is preferably a coiled spring in connection with a drum. Apertures in the back seats provide for the cables to connect with the spring. The spring is in connection with the cable and they are both held in place by a pair of sister hooks which are, in turn, prevented from moving by a release pin.

An inertial sensor sends an electrical signal upon detecting an inertial event. The signal energizes a solenoid in connection with the release pin which in turn allows the sister hooks to open thereby releasing the spring to a forward position as it pulls the cable. The belts are pulled downward through the action of the cables and the netting is deployed in front of each passenger for safety. A hand crank in connection with the spring and drum is used to reset the release means.

It is an object of the invention to provide a seat belt restraining system that operates automatically upon an inertial event and does not require passengers to place the seat belts around themselves for use.

Another objective is to provide a seat belt releasing system that is stored overhead to avoid encumbering passengers when the seat belts are not in use.

Another objective is to provide a seat belt releasing system that releases automatically and prevents against the lateral movement of passengers.

Another objective is to provide a seat belt releasing system that may remain deployed indefinitely after the initial release.

Another objective is to provide a seat belt releasing system that may be easily reset with minimal manual labor.

Yet another objective is to provide a seat belt releasing system that operates upon an inertial event and acts to pull the seat belts down over the passengers from an overhead position.

Still another objective of the invention is to provide a seat belt releasing system that is powered by the force of a wound spring or other similar device.

Another objective is to provide a seat belt releasing system that can be activated automatically and reset by the occupants in the event the seat belts are released.

Other objectives of the invention will become apparent to those skilled in the art once the invention has been shown and described.

DESCRIPTION OF THE DRAWINGS

FIGS. 6A, B Top and side views respectively of apparatus after initial winding with crank still in place.

FIGS. 7A, B Top and side views respectively of apparatus in ready position, crank removed.

FIGS. 8A, B Top and side views respectively of apparatus, after release.

FIG. 9 Detail of straps stored overhead near vehicle ceiling.

FIG. 10 Elastic strap detail.

FIG. 11 Front view of straps.

FIG. 12 Side view after release.

DESCRIPTION OF THE PREFERRED EMBODIMENT

Figure 1:
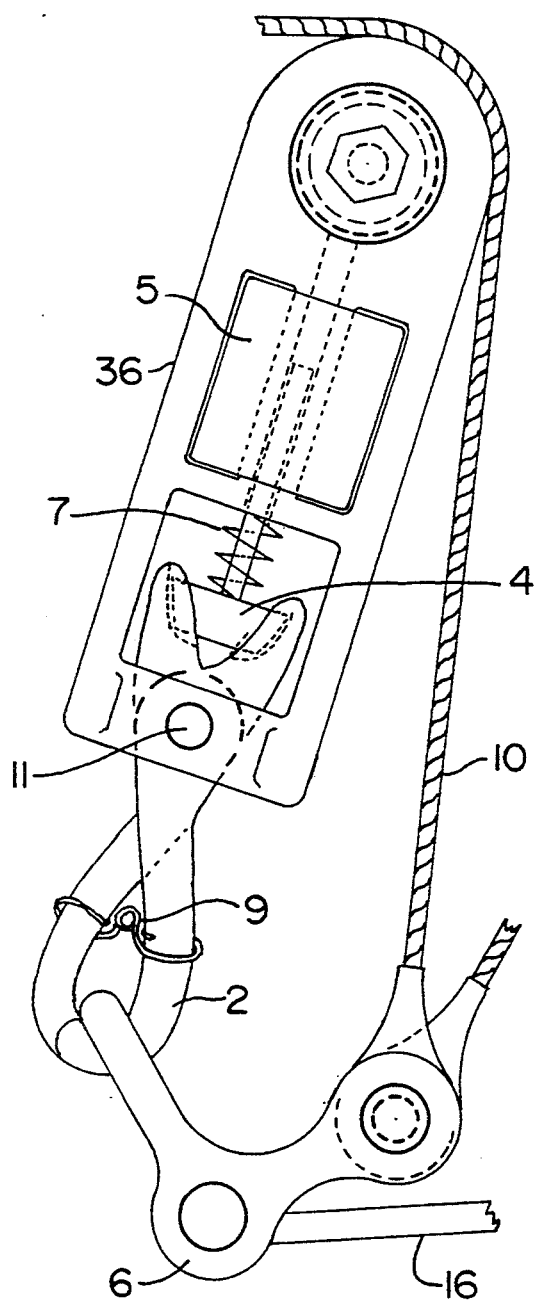
FIG. 1 Sister hook and solenoid release portion.
Figure 2:
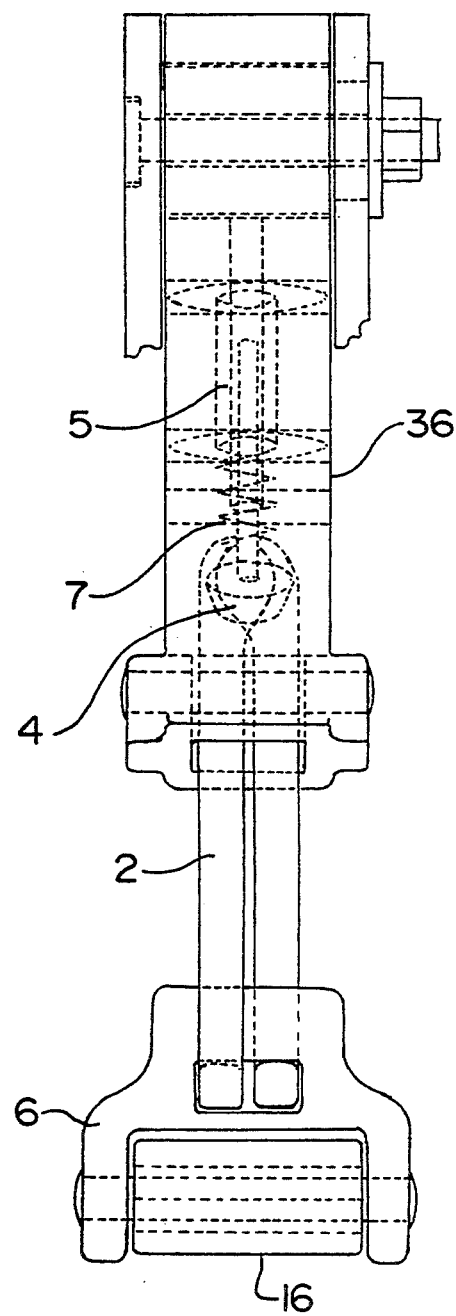
FIG. 2 Sister hook and solenoid side view.
Figure 5:
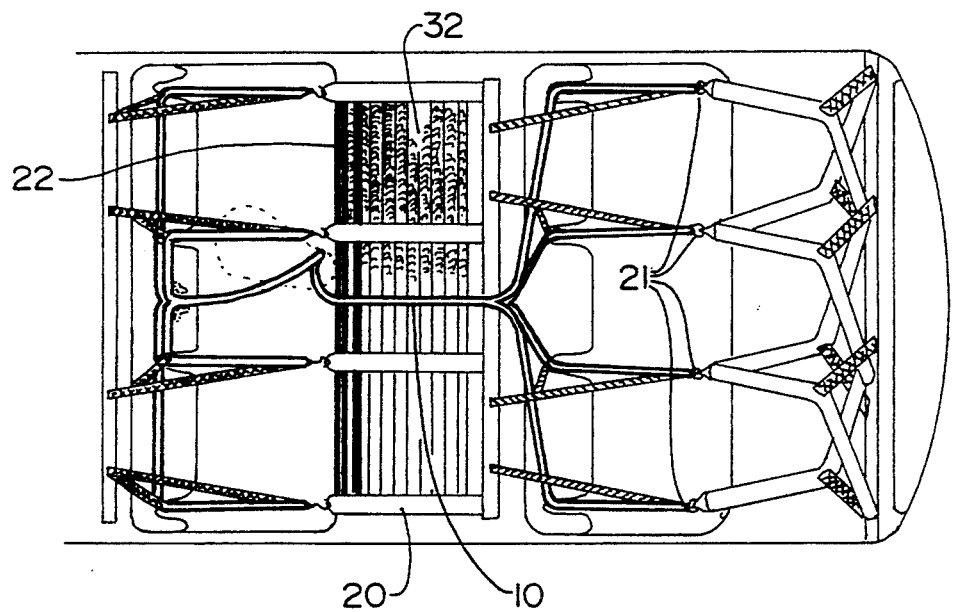
FIG. 5 Top view of seat belts in stored overhead position.
Figure 4:
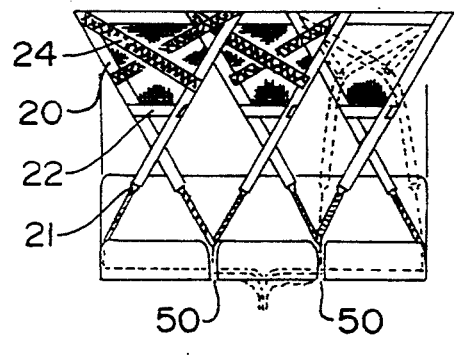
FIG. 4 Front view of seat belts in stored overhead position.

The releasing means for the seat belts is shown in FIGS. 1 and 2. A pair of sister hooks 9 are kept normally closed by means of a release cam 4 which may be e.g. a conical shaped portion, that fits between the hooks. As the hooks pivot about a point 11, the cam is placed between those ends of the hooks that are above this point so as to prevent the hooks from opening inadvertantly. The cam prevents the release of the hooks in the normal at rest position shown in FIGS. 7A and B. This position is then ready to be released (deployed) in the event of a collision (inertial event).

A spring 16 is in connection with a line 10 which may be e.g. a wire cable or other means that are sufficiently durable. Both the cable and the spring are connected to the sister hooks by means of a connector 6. A solenoid means 5 will move the cam or pin upward when the solenoid is energized and this will allow the hooks to move apart thereby releasing part 6 and the cable 10, allowing them to be pulled by the spring 16. The solenoid is energized by an inertial sensing means which will send an electrical signal to the solenoid upon detecting an inertial event e.g. a collision. Upon release of the sister hooks, they allow the spring 16 to spring forward to the position shown in FIG. 8. The action of the spring moving forward, of course, pulls the cable 10 downward and this in turn pulls down the seat belts 20. As the belts move down the lateral connections 22 (which may be e.g. netting or other means) are deployed in front of each passenger, see FIGS. 11 and 12.

The cables may be e.g wire ropes and they are connected to each of the straps 20 through apertures 50 in between the car seats. The seat belts may be thought of as the straps 20, the lateral connections 22 and resilient members 24. Channels 30 in the seats facilitate this by guiding the cables upward from the aperture and toward the ceiling where the seat belt rests, see FIG. 9.

There will need to be at least one aperture between every passenger in order to provide at least one vertical strap 20 on each side of every passenger. There need to be at least two seat belts in order to bring down the attendant lateral connections or netting. It is preferred that there be a pair of straps 20 for every passenger, however, it is possible to use only two straps (one at each end of the seat) to protect the occupants of the entire rear seat (or the front seat as the case may be).

Snap hooks 21 or other releasable connectors may be used to connect portions of a single seat belt to one another or to connect a seat belt directly to the cable. Typically this would be the vertical strap 20 that is connected to the cable 10 in this manner, see FIG. 10. The snap hooks are not used during the release, rather they are used by the occupant so as to release themselves from the seat belts sometime after deployment of the seat belts.

The cable 10 is connected to the releasing means by the connector 6 which is in connection with coiled spring 16. The connector is in connection with the sister hooks 9 so that both spring and cable are effectively connected to the sister hooks. Upon the release of the sister hooks, the cable and spring will move forward to the position shown in FIG. 8 and the belts will be pulled downward.

Figure 3:
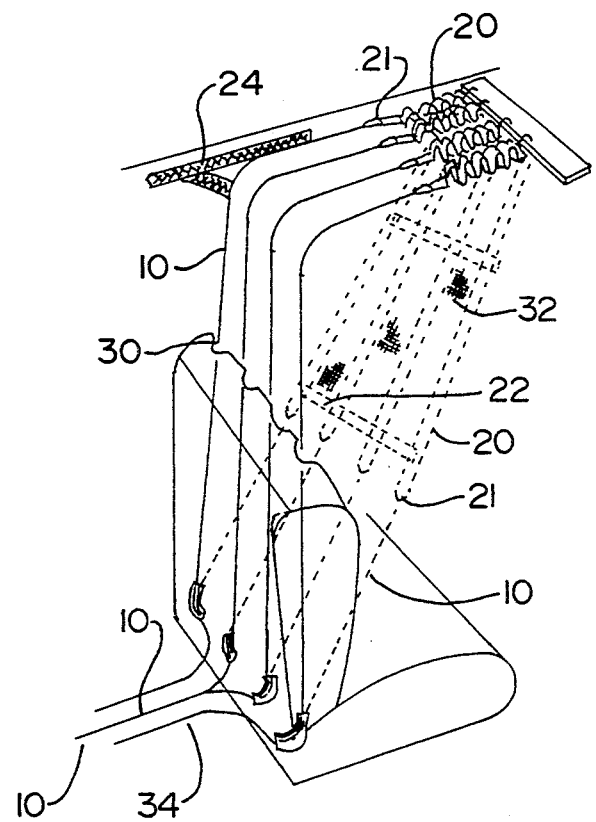
FIG 3 Side view of seat belts in stored and released position.

There is likely to be one cable per strap 20, however there may be a plurality of cables extending through the seats and connected to one main cable. The cables may be connected at a point behind the seat see FIG. 3. There may be several seat belts (straps 20, 22) for the rear seats as well as several for the front seats. The same is true for the front cables and belts, they may be connected to one main cable. Also that cable from the front seat belts may be connected to the rear cable(s) for simplicity.

The cable may be led forward to the front of the vehicle by means of conduit 34 to lead the cable to the front seats. Grooved portions or recesses 30 in the seats may be used to guide the cable at the point where the cable leads from the back of the seats up toward the ceiling.

Lateral members 22, which may be e.g. netting, are stretched across the belts. These members may be made of netting and do the actual cushioning action on the passenger in the event of collision. The members are connected across the belts and will be pulled downward in front of each passenger when the straps 20 are pulled downward.

The belts are positioned across the ceiling at rest, see FIG. 9 and will become vertically oriented through the action of the cables pulling them downward upon deployment. The pull of the wire cable is downward and the belts are pulled from the ceiling directly into the apertures at the rear of the seats. There should be two belts and two corresponding apertures per passenger including the driver of the vehicle. Of course it is possible that one belt may do the work of two by being connected to two sets of lateral members and one aperture need only be used for that strap.

There are a series of elasticized members 26 stretched alongside the straps. This minimizes the length of the straps when at rest see FIG. 10 and also provides a cushioning to the pull of the spring during the deployment. The bands may be for example elastic, bungee cords, etc. Without the elastic members, the straps might hang down to an unacceptable level in the way of passengers.

One way to reset the device may be means of a manually operated turning crank 18 that would be in connection with a threaded worm screw 14 and a stop pin 15. See FIGS. 6–8. The apparatus is in the position show in FIG. 8 after an inertial event. At this time the stop pin 15 is in apertures 19 (in the housing 38) and 41 (in the drum 12) to prevent the drum from movement during the time the device is in the ready position (FIG. 7).

To reset the device, an operator would insert the crank 18 which engages the worm screw 14 and then lift up the stop pin 15. Note that the crank cannot be removed while the stop pin is up (it has to be down) and therefore cannot be inserted while the stop pin is up. By turning the crank, the screw in turn rotates the drum 12. The initial movement of the drum will turn the spring 16 back from the position in FIG. 8 to that in FIG. 6 where piece 6 can be joined to the hooks 2. This position is shown in FIG. 6. Further turning of the crank 18 will tighten the spring further and bring the aperture 41 into line with aperture 19 so that the pin 15 may be manually placed through both thereby preventing the spring from being sprung. The crank may now be removed. This position shown as FIG. 7 where the device remains in this ready position for an inertial event. The event will trigger the release of the hooks 9 which then release the spring which pulls down the seat belts.

I claim:

1. An automotive seat belt restraint system for placement inside of a vehicle and for attachment to the ceiling of such vehicle, the system comprising:

an inertial device having means for providing an electrical signal in response to detecting an inertial event affecting said vehicle;

a pair of sister hooks pivotally connected to one another and having top and bottom ends;

a biasing means connected to said hooks for providing a force urging said hooks away from one another;

a releasing means for preventing said hooks from coming apart when located between said top ends of said hooks and for allowing said hooks to move apart when moved from between the top ends of said hooks;

a means for moving said release means in response to said electrical signal, said means for moving including a solenoid and being electrically connected to said inertial device;

at least one seat belt strap, said strap having two ends, wherein one of said ends is attachable to the ceiling of the vehicle;

a restraining means connectable to said ceiling and attached to the seat belt strap for providing a restraining force urging said seat belt strap towards said ceiling;

a connection line having two ends, one of said connection line ends attached to the other of said seat belt strap ends and the other of said connection line ends attached to one of said bottom ends of said sister hooks; and an actuating means for providing a force greater than said restraining force, said actuating means connected to said connection line, wherein the seat belt strap is moved to an occupant restraining position by the connection line and the actuating means when the inertia device detects the inertial event.

2. The apparatus of claim 1 having a plurality of said seat belt straps and at least one lateral strap in connection with at least two of said seat belt straps, said lateral straps made of resilient material.

* * * * *